United States Patent [19]

Koubek

[11] 4,086,618
[45] Apr. 25, 1978

[54] PROCESS AND CIRCUIT ARRANGEMENT FOR CONTOUR CORRECTION OF THE LUMINANCE SIGNAL IN A TELEVISION CAMERA

[75] Inventor: Michael Koubek, Munich, Germany

[73] Assignee: Siemens Aktiengesellschaft, Berlin & Munich, Germany

[21] Appl. No.: 676,619

[22] Filed: Apr. 13, 1976

[30] Foreign Application Priority Data

Apr. 24, 1975 Germany .............................. 2518328

[51] Int. Cl.² .............................................. H04N 5/14
[52] U.S. Cl. .................................................. 358/166
[58] Field of Search ................. 358/21, 160, 162, 166, 358/96; 178/DIG. 25, 34

[56] References Cited

U.S. PATENT DOCUMENTS

| 3,804,980 | 4/1974 | Lowry | 178/DIG. 34 X |
| 3,814,847 | 6/1974 | Longuet | 178/DIG. 25 X |

Primary Examiner—John C. Martin
Assistant Examiner—Aristotelis M. Psitos
Attorney, Agent, or Firm—Hill, Gross, Simpson, Van Santen, Steadman, Chiara & Simpson

[57] ABSTRACT

The invention relates to a process for the contour correction of the luminance signal in a television camera in which a horizontal contour signal is added to a relatively poorly defined luminance signal in order to increase the vertical resolution, and a vertical contour signal is added thereto in order to increase the horizontal resolution. An additional contour signal ($W_{HV}$) is formed from the product of the horizontal contour signal ($W_H$) with the vertical contour signal ($W_V$), which additional contour signal is deducted from the luminance signal ($W_O$).

5 Claims, 3 Drawing Figures

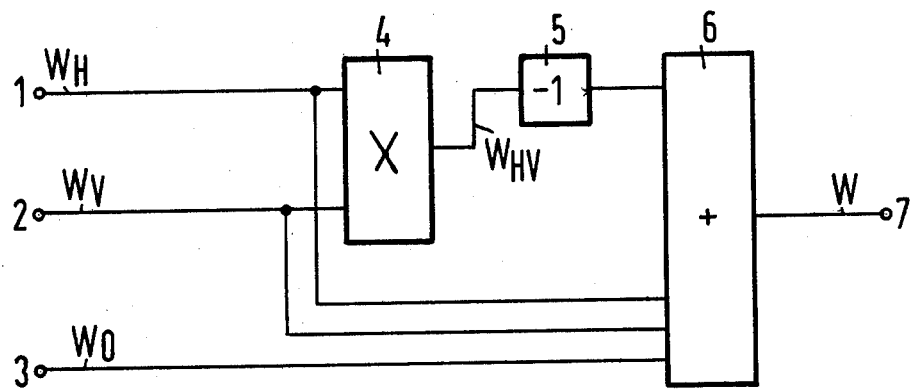
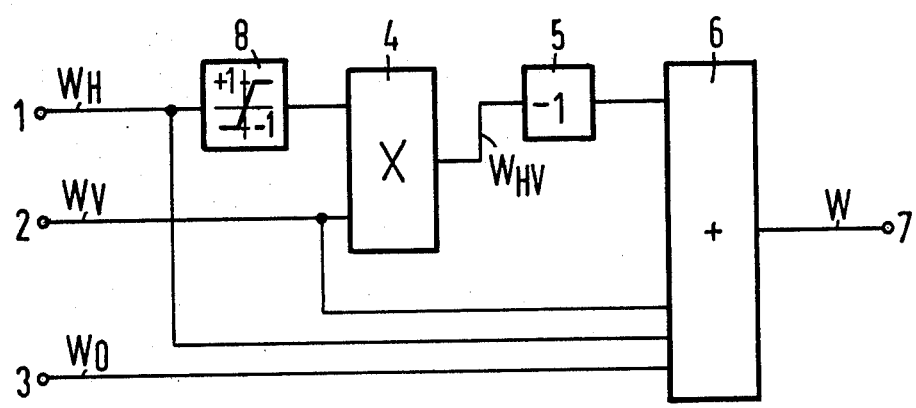
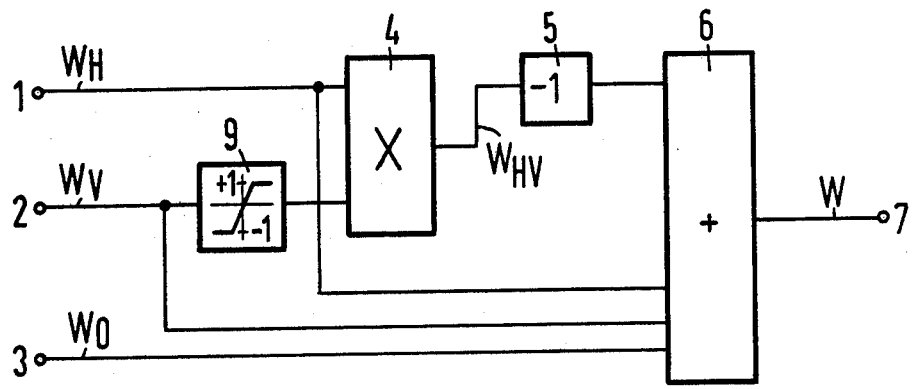

PROCESS AND CIRCUIT ARRANGEMENT FOR CONTOUR CORRECTION OF THE LUMINANCE SIGNAL IN A TELEVISION CAMERA

BACKGROUND OF THE INVENTION

The invention relates to a process for the contour correction of the luminance signal in a television camera in which a horizontal contour signal is added to a relatively poorly defined luminance signal in order to increase the vertical resolution, and a vertical contour signal is added thereto in order to increase the horizontal resolution.

The function of contour signals of this type can be explained most instructively by considering horizontal and vertical lines which are recorded and are to be transmitted by the television camera. Here "horizontal" signifies the direction of a line of the electronic scanning. With these lines, very great demands are placed on the electronic scanning and on the transmission in respect of the resolution of the picture source and the signal transmitted for the reproduction of a sharply defined picture. The finite expansion of the picture points scanned by the electron beam impose limits on the resolution. This can be seen most clearly in that horizontal and vertical sharp lines of the picture source in the case where the luminance information changes abruptly at right angles to the line direction, appear to be poorly defined in the picture reproduction.

To the luminance signal obtained from the modulated electron beam can be added a vertical contour signal (in the following referred to as $W_V$) in order to improve the definition of horizontal lines, and a horizontal contour signal (in the following referred to as $W_H$) in order to improve the definition of vertical lines. This constitutes a simple addition of a signal which weakens the edges of the lines and strengthens the center. The horizontal contour signal $W_H$ (equal to line frequency) here consists in a signal which repeats itself line-by-line and which in the edge regions of the image point, located in the scanned line, of a vertical, for example white line, deducts luminance electrically from the relatively poorly defined luminance signal and in the region of the center of the image point adds luminance. This also correspondingly applies to the vertical contour signal $W_V$ (equal to picture frequency). It is thus ensured that the relatively poorly defined luminance signal which would reproduce clearly defined horizontal and vertical lines in a relatively poorly defined fashion, becomes a clearly defined luminance signal which also reproduces the horizontal and vertical clearly defined lines equally clearly.

However, real picture sources do not consist merely of horizontal and vertical lines. For example, there are intersection points of such horizontal and vertical lines. In the region of these intersection points, the known process of adding a vertical and horizontal contour signal gives rise to unpleasant effects. The addition of luminance information in the center of white lines gives rise to too great an emphasis on luminance at the intersection point of the line centers, since both the horizontal and the vertical contour signal add luminance. On the other hand, for example, in the edge regions of a vertical line which are located at the intersection point on the center of the intersecting horizontal line, the horizontal contour signal $W_H$ serves to withdraw luminance information so that these two zones which actually lie in the center of the horizontal line, which is clearly defined on account of the vertical contour signal $W_V$, again become poorly defined. This also correspondingly applies to the two edge zones of the horizontal line which come to lie in the central region of an intersecting vertical line. The double correcting action of the horizontal and vertical correcting signals $W_H$ and $W_V$ thus gives rise to breaks in the intersecting horizontal and vertical lines in the region of an intersection point. This is referred to as a so-called correlation error.

An intersection point is here reproduced by an over-defined intersection of the line centers and by a surrounding poorly defined halo.

SUMMARY OF THE INVENTION

An object of the present invention is to provide a process for contour correction which enables not only a clearly defined reproduction of horizontal and vertical lines, but also of their intersection points.

For the realization of this aim, in a process of the type described in the introduction, it is proposed in accordance with the invention that an additional contour signal $W_{HV}$ is formed from the product of the horizontal contour signal $W_H$ with the vertical contour signal $W_V$, which additional contour signal is deducted from the luminance signal.

Accordingly, a corresponding circuit arrangement for the execution of the process of the invention contains a multiplier with an input for a horizontal contour signal $W_H$ and with an input for a vertical contour signal $W_V$ and with an output for an additional contour signal $W_{HV}$. This output is connected via an inverter to an input of an adder which is supplied via three further inputs with a relatively poorly defined luminance signal, the horizontal contour signal $W_H$ and with the vertical contour signal $W_V$ and which carries a clearly defined luminance signal at an output.

The frequency spectrum of the picture information obtained from the scanning of a vertical line possesses accumulation points at the whole-numbered multiples of the line frequency. Accordingly, the horizontal contour signal contains spectral frequencies which are located around the whole-numbered multiples of the line frequency. The spectrum of the picture information of horizontal lines contains accumulation points which are located at the odd-numbered multiples of half the line frequency. Here the amplitude rapidly reduces with increasing frequency.

For this reason, the vertical contour signal $W_V$ possesses a relatively low frequency; its spectral frequencies likewise lie in the vicinity of the odd-numbered multiples of half the line frequency. The invention is based on the fact that at intersecting vertical and horizontal lines in the frequency spectrum of the picture information there occur not only frequencies in the range of the whole-numbered multiples of the line frequency and in the region of the relatively low-frequency odd-numbered multiples of half the line frequency, but also high-frequency products of the odd-numbered multiples of half the line frequency and the even-numbered multiples of the line frequency, whose accumulation points are located at high-frequency, odd-multiples of half the line frequency. The information located in these zones cannot be corrected by the horizontal contour signal $W_H$ or by the vertical contour signal $W_V$. It is only a product of the two contour signals $W_H$ and $W_V$ which supplies frequencies which lie in the high-frequency range of the odd-numbered multiples of half the line frequency and with which a correction can be effected in these zones. The addition, provided by the invention, of the additional contour signal $W_{HV}$ serves to prevent the correlation errors which occur in the region of an intersection point in the case of the simple correction with a horizontal contour signal $W_H$ and with a vertical contour signal $W_V$.

An advantageous development of the process of the invention consists in that in order to form the additional contour signal $W_{HV}$, the horizontal contour signal $W_H$ is multiplied only with the sign i.e. the polarity (positive or negative) of the vertical contour signal $W_V$, or the vertical contour signal is multiplied only with the sign i.e. the polarity (positive or negative) of the horizontal contour signal $W_H$.

In a corresponding circuit arrangement, a limiter is connected either in front of the input of the multipler for the horizontal contour signal $W_H$ or in front of that for the vertical contour signal $W_V$.

A simple production formation for the additional contour signal $W_{HV}$ produces an accurate correction result in the case of full black-white contrasts of the lines. In the case of smaller contrast values, this additional contour signal $W_{HV}$ is too small. If only the sign of one of the two contour signals $W_H$ or $W_V$ is taken into consideration in the production formation, precise correction results are achieved even with these smaller contrast values.

BRIEF DESCRIPTION OF THE DRAWINGS

The figures of the drawings illustrate schematically circuit arrangements for the execution of the process in accordance with the invention.

FIG. 1 illustrates a circuit arrangement of a fundamental type; and

FIGS. 2 and 3 show embodiments of the present invention with a limiter.

DESCRIPTION OF THE PREFERRED EMBODIMENTS

The circuit arrangement in FIG. 1 possesses three inputs 1, 2 and 3. A horizontal contour signal $W_H$ is present at the input 1, a vertical contour signal $W_V$ is present at the input 2, and a relatively poorly defined luminance signal $W_O$ is present at the input 3. For the production of the vertical contour signal $W_V$, the relatively poorly defined luminance signal $W_O$ can be delayed once by one single line duration and once by twice a line duration. Accordingly, the undelayed luminance signal $W_O$ with the factor ($-0.25$), the singly delayed signal with the factor ($+0.5$), and the doubly delayed signal with the factor ($-0.25$) are added and thus form the vertical contour signal $W_V$. The horizontal contour signal $W_H$ can be produced by feeding the relatively poorly defined luminance signal $W_O$ across a low-pass filter with a limitation of, e.g., 1 MHz. This limited luminance signal is then deducted from the unlimited signal which was previously fed across a transit time element in order to simulate the transit time of the low-pass filter. The difference then forms the horizontal contour signal $W_H$.

The two inputs 1 and 2 are connected to a multiplier 4, which at its output is connected via an inverter 5 to one of four inputs of the adder 6. The output of the adder 6 is connected to an output 7 for a sharply defined luminance signal W. The three other inputs of the adder 6 are each connected to the inputs 1, 2 and 3, respectively. The multiplier 4, the inverter 5, and the adder 6 are of the usual type.

The circuit arrangements illustrated in FIGS. 2 and 3 contain the elements shown in FIG. 1. In FIG. 2, a limiter 8 is connected between the input 1 for the horizontal contour signal $W_H$ and the corresponding input of the multiplier 4. In FIG. 3, a limiter 9 is connected between the input 2 for the vertical contour signal $W_V$ and the corresponding input of the multiplier 4. The limiters 8 and 9 serve to ensure that the limited contour signal $W_H$ and $W_V$ respectively participates merely by its sign i.e. the polarity (positive or negative) and a limited magnitude (such as "1" shown in FIGS. 2 and 3) of the limited signal $W_H$, $W_V$ in the multiplication with the particular other contour signals $W_V$, $W_H$ respectively. These limiters are, e.g., in the form of two diodes connected in antiparallel fashion.

As can be seen from these relatively simple block circuit diagrams of the drawing, the process of the invention requires only a low outlay. To the two contour signals $W_H$ and $W_V$ which are to be added to form the relatively poorly defined luminance signal $W_O$ is added merely one further contour signal $W_{HV}$ which is obtained in a simple fashion. In comparison to this low outlay, the success achieved in the prevention of the unpleasant correlation errors is very great. The process in accordance with the invention can be employed quite generally in any type of television camera.

It will be apparent to those skilled in the art that many modifications and variations may be effected without departing from the spirit and scope of the novel concepts of the present invention.

I claim as my invention:

1. A circuit arrangement for contour correction of the luminance signal in a television camera, comprising an adder, means for feeding a relatively poorly defined luminance signal to said adder, means for feeding a horizontal contour signal to said adder for increasing the vertical resolution of the luminance signal, means for feeding a vertical contour signal to said adder for increasing the horizontal resolution of the luminance signal, signal multiplying means for deriving an additional contour signal which is the multiple of said horizontal and vertical contour signals, a signal inverter, means for feeding said additional derived contour signal through said signal inverter to said adder, said adder having an output terminal from which the combined signals may be taken.

2. A circuit arrangement according to claim 1, which includes a signal limiter inserted in the input circuit of said horizontal contour signal to said multiplying means.

3. A circuit arrangement according to claim 1, which includes a signal limiter inserted in the input circuit of said vertical contour signal to said multiplying means.

4. A circuit arrangement according to claim 1, in which in the product formation of the additional contour signal, means are provided for the polarity and a limited magnitude only of the vertical contour signal to be taken into acount as a factor.

5. A circuit arrangement according to claim 1, in which in the product formation of the additional contour signal, means are provided for the polarity and a limited magnitude only of the horizontal contour signal to be taken into account as a factor.

* * * * *